United States Patent

[11] 3,549,005

| [72] | Inventor | Theodore P. Kalogris<br>P.O. Box 30025, Bethesda, Md. 20014 |
|---|---|---|
| [21] | Appl. No. | 725,333 |
| [22] | Filed | Apr. 30, 1968 |
| [45] | Patented | Dec. 22, 1970 |

[54] THERMOMETER HOLDER
3 Claims, 8 Drawing Figs.

[52] U.S. Cl. .................................................. 206/16.6
[51] Int. Cl. .................................................. B65d 81/22
[50] Field of Search .......................................... 206/16.6,
47B, Adhesive; 21/90, 88, 87; 248/311, 205A;
220/60

[56] References Cited
UNITED STATES PATENTS

| 1,501,824 | 7/1924 | Upton .......................... | 21/90X |
| 3,317,274 | 5/1967 | McCormick ................. | 21/87 |
| 537,146 | 4/1895 | Froehlich ..................... | 206/47BUX |
| 2,191,782 | 2/1940 | Valaue .......................... | 248/311X |
| 3,321,068 | 5/1967 | Beach ........................... | 206/16.6 |
| 2,370,204 | 2/1945 | Sutherland ................... | 220/60UX |
| 2,944,273 | 7/1950 | Harris ........................... | 220/60X |

FOREIGN PATENTS

| 302,988 | 6/1929 | Great Britain ............... | 206/47B |

Primary Examiner—Joseph R. Leclair
Assistant Examiner—John M. Caskie
Attorneys—Clarence A. O'Brien and Harvey B. Jacobson ABSTRACT: A first embodiment of the present invention includes a tubular thermometer case adapted for insertion within a vial. The case includes an aperture therein for permitting the passage of antiseptic into the case thereby sterilizing a contained thermometer. The vial functions as an antiseptic reservoir. The second embodiment includes a thermometer case containing antiseptic. No separate reservoir is provided in this latter embodiment. A holder includes a first recess permitting removable insertion of the thermometer case therein and a second recess therein for retaining a cap of the thermometer case when the case is uncapped.

PATENTED DEC 22 1970
3,549,005
SHEET 1 OF 2
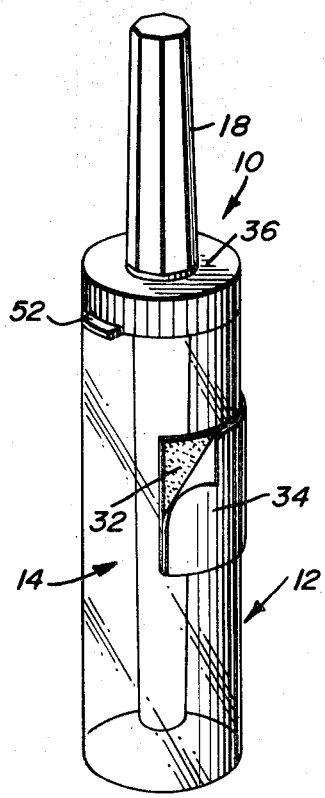
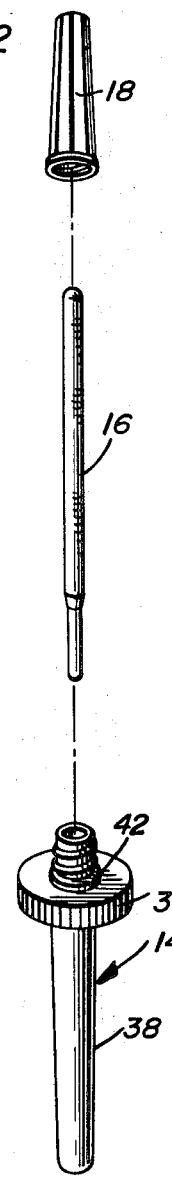
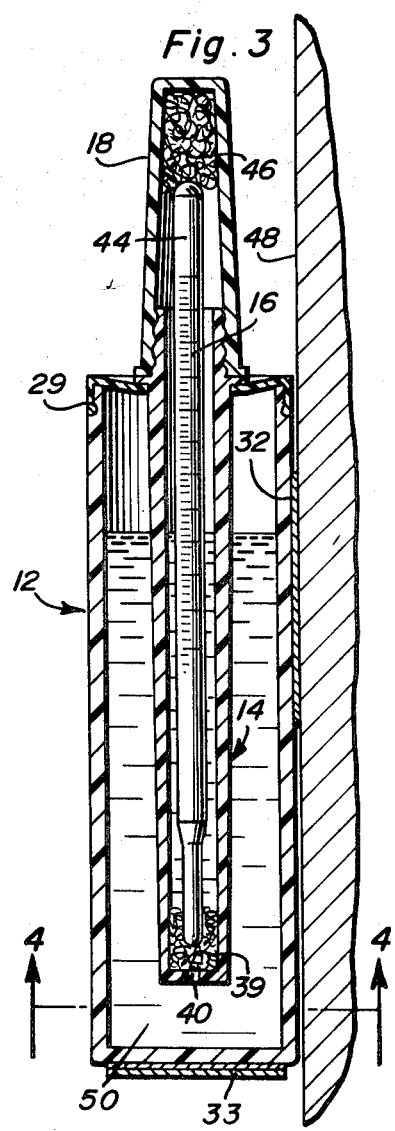
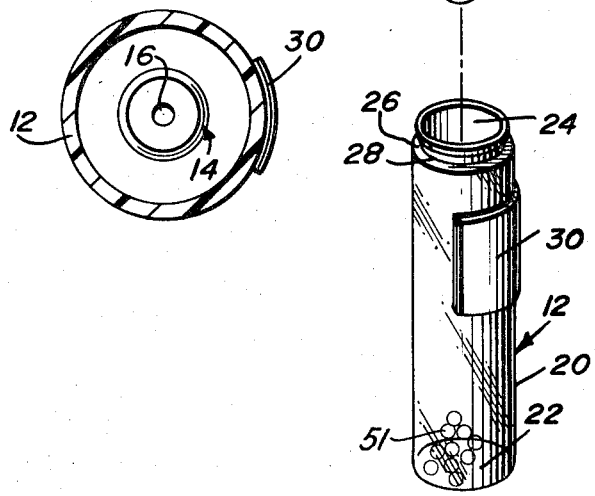
Theodore P. Kalogris
INVENTOR.
BY Clarence A. O'Brien
and Harvey B. Jacobson
Attorneys Theodore P. Kalogris
INVENTOR.

3,549,005

THERMOMETER HOLDER

The present invention relates to thermometer cases and more particularly to such a case adapted for retaining antiseptic therein.

The prior art includes a number of thermometer cases which are adapted to contain an antiseptic solution for purposes of maintaining a contained thermometer in a sterile condition. However, these cases have been constructed in such a way as to render the periodic changing or addition of antiseptic a time-consuming process. This becomes a marked disadvantage when an attendant must refill a large number of such cases, as for example in a hospital.

The present invention includes a first embodiment including an apertured thermometer case removably submerged within an antiseptic reservoir in a manner permitting convenient removal of the case therefrom so that the antiseptic from the reservoir may be replaced with a fresh supply. The time required for accomplishing this procedure is kept at a minimum due to the capability of rapid removal of the thermometer case from the reservoir. The thermometer case includes an aperture therein for permitting the passage of antiseptic solution therethrough so that actual removal of the thermometer from its case is unnecessary during a filling or draining operation. A second embodiment of the present invention includes a capped case that is removably retained in a recess formed in a case holder. A second recess in the holder permits the placing of the case cap therein during periods when the thermometer is used. Thus, the annoyance of finding a misplaced thermometer case cap is eliminated. Both embodiments of the present invention anticipate the manufacture and distribution thereof with a dry antiseptic or a small amount of antiseptic concentrate in the thermometer case which may be manufactured, shipped and distributed with the aforementioned antiseptic materials contained therein. Prior to utilization of the thermometer, water is poured into the case so as to activate the antiseptic material. This technique obviates the necessity of filling each thermometer case with an antiseptic material prior to utilization of the thermometer. Accordingly, a patient or unskilled person in a hospital or clinic may prepare the thermometer case without the assistance of skilled attendants by merely adding water to the thermometer case. Thus, the precious time of medical attendants may be utilized in a more advantageous and strategic manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the first embodiment of the present invention.

FIG. 2 is an assembly view illustrating the components of the device shown in FIG. 1.

FIG. 3 is a vertical cross-sectional view of the device shown in FIG. 1.

FIG. 4 is a transverse cross-sectional view taken along a plane passing through section line 4—4 of FiG. 3.

Figure 5:
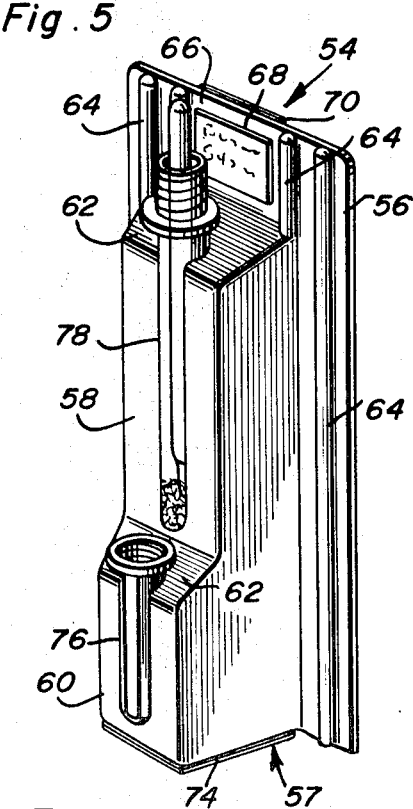
FIG. 5 is a perspective view of the second embodiment of the present invention.
Figure 6:
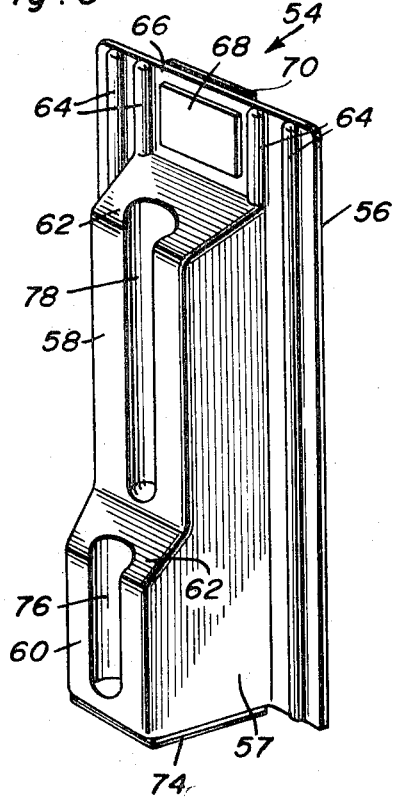
FIG. 6 is a perspective view of the thermometer case holding means.
Figure 7:
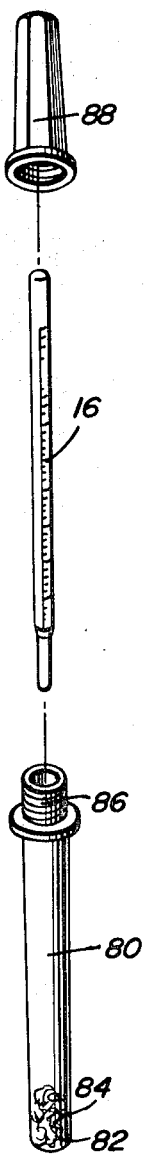
FIG. 7 is an assembly view of a thermometer and its respective case.

Referring specifically to the drawings, a first embodiment of the present invention is shown in FIGS. 1—4 and is denoted by reference numeral 10. This embodiment includes a right cylindrical hollow vial 12, a tubular thermometer case denoted generally by 14, a thermometer 16 adapted for insertion within the tubular enclosure and a cap 18 adapted to close the tubular case 14.

Referring specifically to FIG. 2, the vial 12 is seen to include a transparent plastic cylindrical wall 20 closed at one end thereof as indicated by 22. The oppositely disposed end 24 thereof is opened and is characterized by a diameter somewhat smaller than the adjacent diameter of the cylindrical wall 20. Therefore, a shoulder 26 is formed at the intersection of the cylindrical wall 20 and the open end portion 24. The latter mentioned open end portion 24 includes an annular recess 28 disposed along the outer periphery thereof. This recess is adapted to accept a mating flexible annular flange portion 29 in snapping engagement therein. The annular flange portion is integrally attached to an inward portion of thermometer case 14 as shown in FIG. 3. A mounting strip 30 is attached to the cylindrical wall 20 of the vial 12. This mounting strip may be in the form of a double-stick adhesive 32 with a covering strip 34 or a plush-pile strip fastener such as Velcro. A similar second strip 33 may be attached to the vial base for horizontal attachment. Also, other modes of support are contemplated such as a hook or loop at the top of the vial. It is noted that the thermometer case 14 is fabricated from a suitable transparent material such as glass or plastic thereby permitting a transparent view of thermometer 16 when enclosed within the case, the latter being retained within transparent vial 12. As seen in FIG. 1, the thermometer case 14 is adapted for coaxial disposition within cylindrical vial 12. Also, the thermometer 16 is adapted for coaxial retention within thermometer case 14, the cap 18 preventing the thermometer 16 from slipping out from its case.

Attention is directed to FIG. 2 showing the structure of the thermometer case 14, which includes a hollow cylindrical closure portion 36 coaxially mounted upon a tubular portion 38 closed at the bottom end thereof. This end is adapted to include therein a cushion or packing material 39 shown in FIG. 3. Further, FIG. 3 illustrates the inclusion of a pinhole 40 in the central portion of the bottom end. The opposite end of the tubular portion 38 includes a threaded portion 42. The thermometer case 14, as mentioned previously, is adapted for coaxial retention within vial 12 by means of a mating recess and annular flange 29 explained hereinbefore and shown in FIG. 3. This FIG. also illustrates that the manipulating end 44 of thermometer 16 when retained in its associated case passes outwardly from the threaded tubular portion thereof. Cushion or packing material 46 is disposed inwardly of cap 18 so that thermometer 16 is secured within its case when cap 18 is disposed thereon. It is noted that cap 18 includes a threaded portion on the outward end thereof to threadingly engage the threaded tubular portion 42 of thermometer case 14 as clearly shown in FIG. 3. Vial 12 and the thermometer supporting structure contained therein may be mounted to a suitable wall surface 48. It will of course be appreciated that a smooth hard wall surface would be desirable for maximum adhesion when an adhesive material 32 is utilized. However, a mating plush-pile fastening material such as Velcro would have to be attached to the wall surface 48 in order for the Velcro mounting strip 32 to attach thereto, should Velcro be employed instead of an adhesive mounting strip.

As shown in FIG. 3, antiseptic solution fills a greater portion of vial 12 as denoted by 50. Thus, the vial acts as an antiseptic reservoir. The thermometer case 14 is submerged within the vial so that antiseptic solution 50 passes through aperture 40 for absorption by packing material 39. Seepage through the packing material will result in a level of antiseptic solution in the thermometer case substantially equal to the level within reservoir vial 12. Accordingly, the thermometer is submerged in an antiseptic solution thereby retaining the thermometer in a sterile condition. It is noted that the packing material 39 prevents the bulb of the thermometer from occluding the pinhole 40 which would prevent the rise of antiseptic solution in the thermometer case. Further, it will be noted that raising thermometer case 14 upwardly from the antiseptic reservoir results in outward seepage of antiseptic therefrom through the loosely packed packing material 39. The antiseptic may now be easily removed from vial 12 should such be required and the thermometer case replaced therein after fresh antiseptic has been added to the vial. To facilitate the displacement of thermometer case 14 from the vial, a tab or projection 52 shown in FIG. 1 is integrally formed in the cylindrical portion 36 of the case. As previously mentioned, it is within the purview of the present invention to include a powdered antiseptic 51 (FIG. 2) or concentrated antiseptic solution within vial 12 during the manufacturing process thereof. Accordingly, after receipt thereof by a patient, the antiseptic solution may be activated by merely adding water to the vial until an indicated level is attained. Thus, a liquid germicidal solution is formed which keeps the thermometer, even through in its case, in a sterile condition when submerged in the reservoir vial. The thermometer case may be removed from the reservoir after a predetermined amount of antiseptic evaporation has occurred, and after the addition of a few drops of water thereto, the antiseptic solution retains its original strength.

FIGS. 5—8 illustrate a second form of the present invention 54 and is seen to include a backing plate 56 fabricated from a suitable plastic material or the like mounting a hollow thermometer case holder denoted by 57. This holder includes a first portion 58 of substantially rectangular cross section appending to a shorter portion 60 of larger rectangular cross-sectional area than the first aforementioned portion thus forming vertically spaced offset portions. The aforementioned housing portions are connected by means of an appending curved flange 62. The backing plate 56 includes a number of longitudinal ribs 64 integrally formed therein for purposes of rigidifying the backing plate structure. A planar portion 66 on the mounting surface of backing plate 56 permits the mounting of a nameplate 68 thereon. A mounting strip 70 is disposed in spaced overlying relation to nameplate 68 on the opposite surface of backing plate 66. This mounting strip may be of the form previously mentioned in connection with mounting strip 30 of the first embodiment. The mounting strip permits the attachment of holder 57 to a wall surface 72. A similar mounting strip 74 is attached to the base portion of holder 57 for providing means of attaching the same to a horizontal surface.

The second housing portion 60 includes a cylindrical recess 76 longitudinally disposed therein to permit the insertion of a thermometer case cap mentioned hereinafter. A second cylindrical recess 78 formed in the first holder portion 58 is disposed in longitudinal parallel relation with the first-mentioned recess 76. The second recess provides means for retaining the thermometer case 80 shown in FIG. 7.

Figure 8:
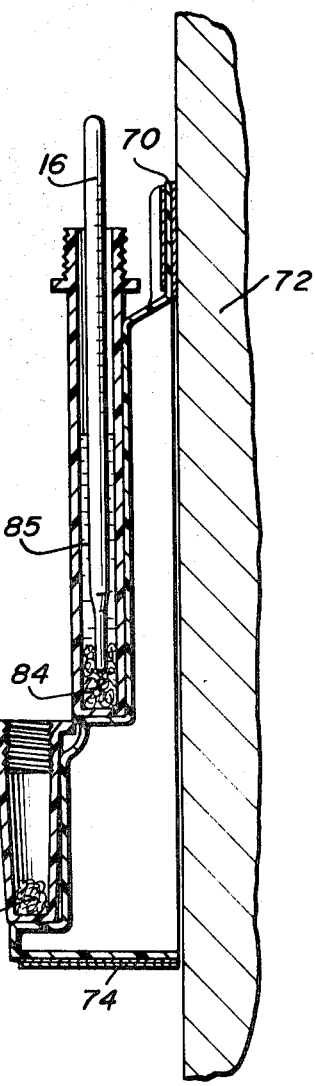
FIG. 8 is a vertical cross-sectional view of the structure shown in FIG. 5.

The thermometer case 80 is closed at one end 82 thereof. Loosely packed packing or cushion material 84 is retained inwardly of this end for the purpose of cushioning a thermometer 16 normally retained therein. As shown in FIG. 8, antiseptic solution 85 is retained within case 80 thereby maintaining thermometer 16 inserted therein in a sterile condition. It is noted that the thermometer case 80 is fabricated from a transparent glass or plastic material thereby permitting a clear view of thermometer 16 enclosed therein. An end portion 86 of thermometer case 80 opposite the closed end 82 is threaded to permit threaded engagement by a cap 88 similarly threaded, which removably closes the thermometer case 80. It is noted that the inward end of this cap includes packing or cushioning material 89 shown in FIG. 8 so that when the cap is mounted on thermometer case 80 with the thermometer 16 enclosed therein, the possibility of thermometer movement within the case 80 is reduced to a minimum. As seen in FIG. 5, the first recess 76 permits the temporary retention of cap 88 therein when thermometer 16 is being used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A clinical thermometer assembly comprising a vial having a closed end and an oppositely disposed open end, an annular groove formed around the open end, tubular means closed at one end thereof for containing a clinical thermometer therein, said tubular means being removably inserted within said vial, an aperture formed in the closed end of said tubular means, a cover integrally formed concentrically with said tubular means, said cover having an annular flange thereon to engage the annular groove for effecting snapping closure of the cover with respect to the vial, and a tab integrally appending from the cover to permit lifting of the tubular means out from the vial allowing the filling of the vial, and mounting means disposed around the cylindrical wall of the vial as well as the closed end thereof for rendering flexible utilization when attaching the vial to a mounting surface, a cap for removably closing said tubular means thereby enclosing the clinical thermometer therein, absorbent spacer means disposed in said tubular means immediately inwardly of said aperture for retaining a bulb portion of the clinical thermometer in spaced relation to said aperture, and cushioning material disposed in the cap, the material being contacted by the thermometer end opposite the bulb.

2. The device set forth in claim 1 wherein said vial contains an antiseptic solution therein, said solution being caused to enter said tubular means through said aperture for sterilization of said thermometer.

3. The apparatus set forth in claim 1 wherein said vial includes an antiseptic substance to which water may be added thereby forming an antiseptic solution of a predetermined strength.